(12) United States Patent
Skender

(10) Patent No.: US 8,445,049 B2
(45) Date of Patent: May 21, 2013

(54) ROASTING APPARATUS AND PACKAGING SYSTEM FOR PROVIDING A COOKED FOOD PRODUCT HAVING A LONG SHELF LIFE

(76) Inventor: David J. Skender, Peoria, IL (US)

( * ) Notice: Subject to any disclaimer, the term of this patent is extended or adjusted under 35 U.S.C. 154(b) by 162 days.

(21) Appl. No.: 12/695,654

(22) Filed: Jan. 28, 2010

(65) Prior Publication Data

US 2011/0183051 A1  Jul. 28, 2011

(51) Int. Cl.
*A23L 3/16* (2006.01)
(52) U.S. Cl.
USPC .............................. 426/521; 426/520; 99/352
(58) Field of Classification Search
USPC ........ 426/520, 521, 523, 524; 422/28; 99/352
See application file for complete search history.

(56) References Cited

U.S. PATENT DOCUMENTS

| | | | |
|---|---|---|---|
| 3,515,119 A | 6/1970 | Kivela | |
| 3,689,282 A * | 9/1972 | Feinberg | 426/234 |
| 3,917,445 A | 11/1975 | Suva et al. | |
| 5,230,915 A * | 7/1993 | Shahidi et al. | 426/240 |
| 5,364,645 A * | 11/1994 | Lagunas-Solar et al. | 426/248 |
| 5,470,597 A * | 11/1995 | Mendenhall | 426/521 |
| 5,472,725 A * | 12/1995 | Mendenhall | 426/521 |
| 5,534,679 A | 7/1996 | Beaver et al. | |
| 6,012,444 A | 1/2000 | Skender | |
| 6,393,971 B1 | 5/2002 | Hunot | |
| 7,319,214 B2 | 1/2008 | Cho et al. | |
| 2007/0012201 A1 | 1/2007 | Ho | |
| 2007/0048421 A1 * | 3/2007 | Owensby et al. | 426/412 |

FOREIGN PATENT DOCUMENTS

| | | | |
|---|---|---|---|
| CA | 2049760 | * | 2/1992 |
| FR | 2406954 | | 5/1979 |
| JP | 57-181666 | * | 11/1982 |
| JP | 61-115463 | * | 6/1986 |
| JP | 61-195667 | * | 8/1986 |
| JP | 61-202673 | * | 9/1986 |

OTHER PUBLICATIONS

Jennie-O Oven Ready Turkey, cooking bag, [on line] May 14, 2007, retrieved on Feb. 12, 2012. Retrieved from the Internet: URL:<http://web.archive.org/web/20070314214455/http://www.jennieo.com/ovenready/default.asp>.*
Sterigenics, The sterilisation of spices, herbs and vegetable seasonings: Understanding the options, Oak Brook, Illinois, 2007-no month given.*
FR 2 406 954, May 25, 1979, translation.*

* cited by examiner

*Primary Examiner* — Rena Dye
*Assistant Examiner* — Chaim Smith
(74) *Attorney, Agent, or Firm* — Merek, Blackmon & Voorhees, LLC

(57) ABSTRACT

A system and method of packaging a food product which provides a long shelf life, wherein the food product is cooked on rollers heated to 500° to 550° F. degrees in an oven heated to 750° to 800° F. for less than ten minutes and then enters a blast chiller at about 5° F. After cooling the product to 40° F. the product is placed in a cook-in bag, seasonings are added and the bag is vacuum-sealed and stored in a cooler at about 40° F. or lower. The seasonings are irradiated prior to being added to the food product to further control pathogen growth.

6 Claims, 7 Drawing Sheets

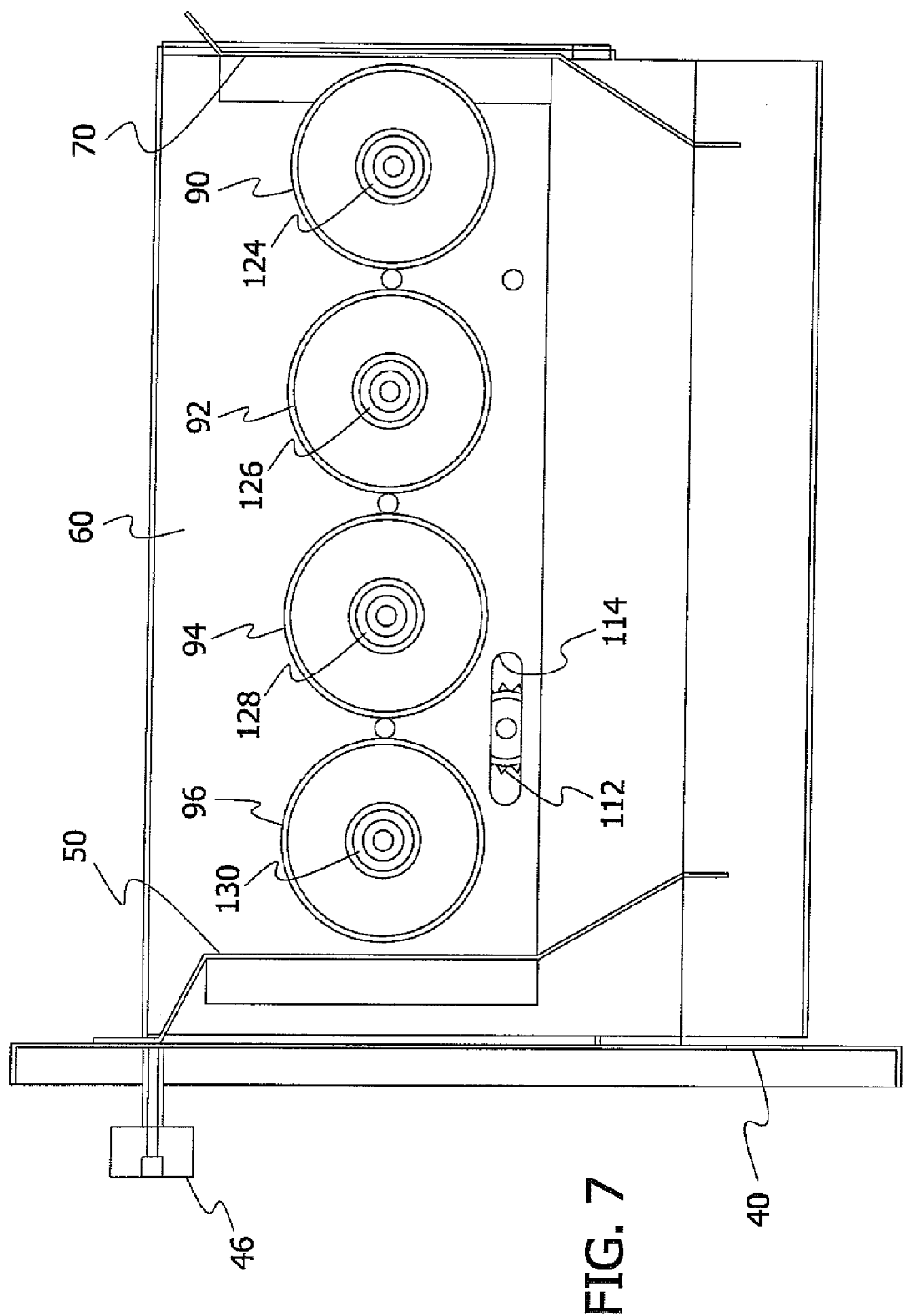

ROASTING APPARATUS AND PACKAGING SYSTEM FOR PROVIDING A COOKED FOOD PRODUCT HAVING A LONG SHELF LIFE

FIELD OF THE INVENTION

The present invention relates to cooking using high temperature radiant heating in a closed oven having a food product rotating device to enhance flavor and cooking efficiency and having a packaging sequence for providing a cooked food product having a long shelf life.

BACKGROUND OF THE INVENTION

Installation of radiant burners above the food to be cooked results in several advantages as described in my prior U.S. Pat. No. 6,012,444 which is incorporated herein by reference in its entirety and in U.S. patent application Ser. No. 11/878,832, now abandoned filed Jul. 27, 2007 which is also incorporated herein in its entirety. Importantly, juices falling from the cooking food will not fall on the burners. This reduces flare-up and smoke in the cooking process. Without juices or fats falling on the burners, there is no chance for the meat to be overcooked by charring or catching on fire. Further, when using a rotisserie, the burner can be set at a high temperature so that the radiant heat rays penetrate into the food which provides fast and efficient cooking without burning. However, when using a conventional rotisserie, the meat product must be attached to or skewered on a spit which is a labor intensive manner of cooking.

The labor and time involved increases as the volume of meat is increased. When cooking for a restaurant or for sale as prepackaged cooked meats, the labor involved in cooking becomes a more important as the oven is used repeatedly to cook meat products. In these commercial applications the turnaround time of removing cooked meat from the oven and replacing it with raw meat is an important factor.

Another important factor is the packaging process after cooking to package the cooked food product so as to provide a long shelf life. Under proper conditions, the shelf life can exceed 60 days without freezing the product.

In view of the foregoing, it can be seen that there is a need for a new radiant burner cooking system which provides a fast cooking time and a flavorful cooked product packaged for a long shelf life while avoiding laborous and time consuming activities of cooking on a spit.

OBJECTS AND SUMMARY OF THE INVENTION

The present invention provides a fast cooking apparatus, system and method through the use of an oven having radiant burners located interiorly at the top portion thereof and a set rollers which rotate the food product to cause even heating of the product under the radiant burners.

Accordingly, it is an object of the invention to provide a food product cooking device having rotating tubes for turning the food product during cooking.

Yet another object of the invention is a method of cooking food products using rotating rollers and radiant heating.

Still another object of the invention is to provide a roasting oven having a sliding roller system to facilitate use and cleaning of the supporting rollers.

Another object of the invention is the use of wheeled support legs to assist in supporting the sliding roller system.

Yet another object of the invention is to provide removable rollers to facilitate cleaning of the food product rotating system.

Still another object of the invention is to provide a drawer system having a motorized roller assembly for use with a roasting oven.

Still another object of the invention is to provide rollers heated to 500° to 550° F.

Yet another object is to provide a food product cooking device having an air temperature within the heated oven at preferably 750° to 800°.

Another object of the invention is that after the food product leaves the oven, it is transported to a blast chiller.

Still another object of the invention is to package the food product in a cook-in bag after it leaves the blast chiller Yet another object of the invention is to provide sterilized seasonings to prevent bacterial growth.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Other objects, uses and advantages will be apparent from a reading of this description which proceeds with reference to the accompanying drawings forming a part thereof.

In summary, the invention is directed to, in a preferred embodiment, as a cooking system having an oven including an interior heating space within an enclosure formed by a top wall, a bottom wall, a rear wall, a left side wall, a right side wall and a door for accessing the interior heating space wherein the oven further includes a radiant burner assembly adjacent the top wall and the oven further including a drawer assembly located adjacent the bottom wall and having a series of rollers for supporting a food product during operation of the oven. The drawer assembly includes a motor operatively connected thereto for causing the series of rollers to rotate, whereby the food product can be rotated on said rollers during operation of the oven.

The invention includes as a part of the cooking system, a movable drawer assembly for use with a roasting oven. The drawer assembly includes a movable enclosure having a front wall, a right side wall, a left side wall and a rear wall and a series of rollers extending between said side walls. The said rollers being rotatable and adapted to support a food product and a motor is mounted on one of said side walls and is adapted to rotate the series of rollers.

The invention further includes a method of cooking a food product comprising the steps of withdrawing a roller rack having a plurality of rollers from an oven, placing a food product on the roller rack, sliding the roller rack into the oven, and operating the roller rack to turn the food product during cooking and applying heat from a radiant heat source located above the roller rack to apply heat to and cook the food product.

The invention further includes a method of packaging a food product which provides a long shelf life, wherein the food product is cooked on rollers heated to 500° to 550° F. degrees in an oven heated to 750° to 800° F. for less than ten minutes and then enters a blast chiller at about 5° F. After cooling the product to 40° F. the product is placed in a cook-in bag, seasonings are added and the bag is vacuum sealed and stored in a cooler at about 40° F. or lower. The seasonings are irradiated prior to being added to the food product to further control pathogen growth.

BRIEF DESCRIPTION OF THE DRAWINGS

FIG. 7 is a right side view of the drawer assembly

DESCRIPTION OF THE PREFERRED EMBODIMENT

Figure 1:
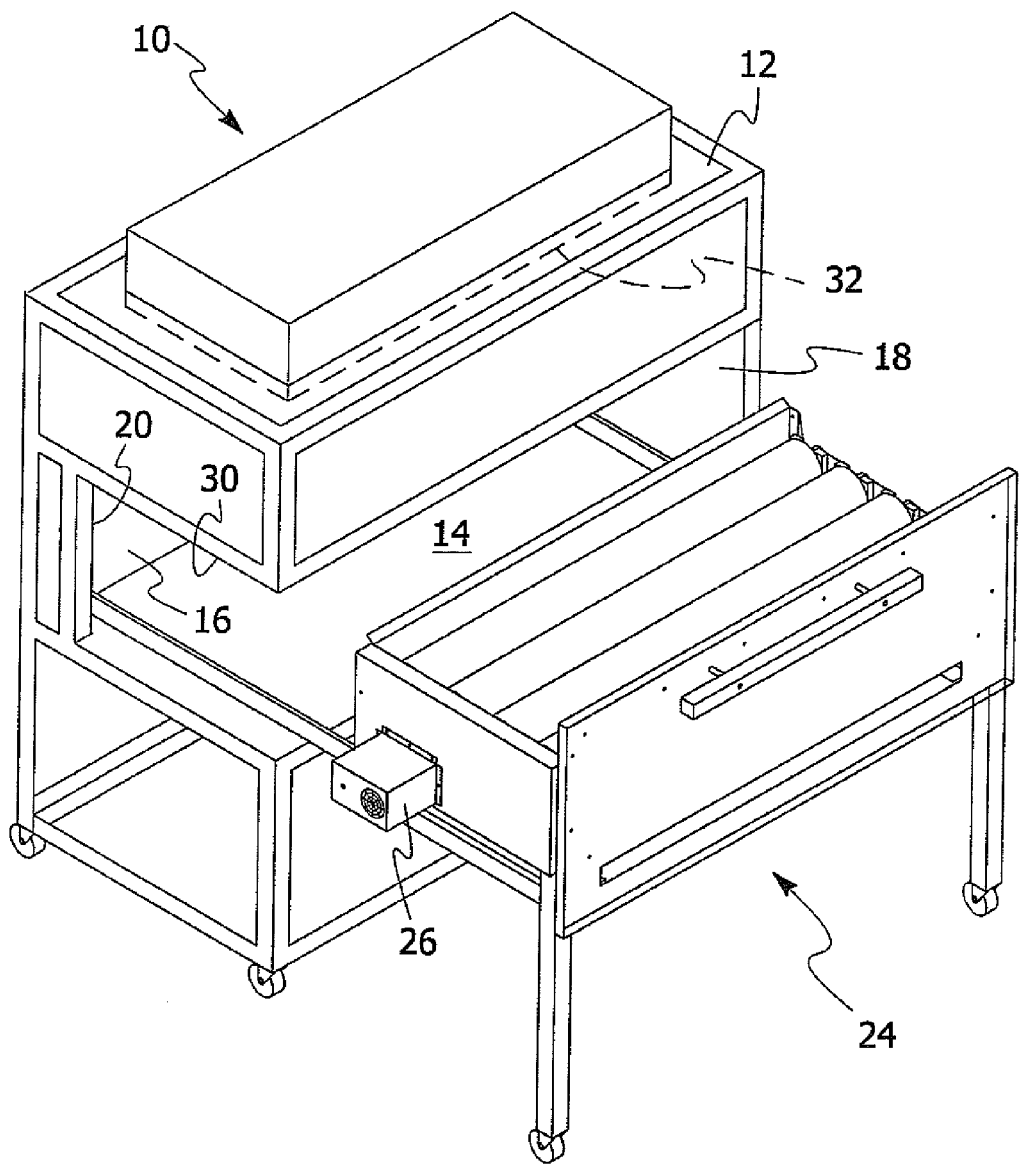
FIG. 1 is a front view of an oven with the drawer assembly pulled out.

This invention will now be described by way of example only with reference to the accompanying drawings. It should be appreciated however that modifications and improvements may be made to the invention without departing from the spirit thereof. Referring to FIG. 1, an oven 10 includes a top wall 12, a bottom wall 14, a rear wall 16, a right side wall 18, a left sidewall 20 and a slidable drawer assembly 24. All of the walls 12, 14, 16, 18, and 20 are constructed of non-combustible materials and are preferably stainless steel. The oven 10 may vary in size, but is preferably about three feet high and about five feet wide and two and one-half feet in depth. The drawer assembly 24 is preferably slidably mounted within the oven 10 preferably at the lower portion thereof and extends across oven 10 from wall 20 to wall 18. An electric motor 26 is located exteriorly of the oven 10 adjacent wall 20 and is connected to drawer assembly 24 for rotating rollers 28. It should be understood that the motor 26 may be a variable speed motor and may be mounted on either side of oven drawer assembly 24. The motor 26 extends through wall 20 via a slot 30. A radiant burner assembly 32 is located at top wall 12 and directs radiant heat downwardly onto the food product supported by the rollers 28. The rollers 28 are preferably about five inches in diameter and spaced apart about on-half inch and is preferably constructed of stainless steel although other suitable materials may be used. The size of the rollers 28 and their spacing may vary according to a particular application. The food product is typically meat such as pork roast or beef roast which is formed of a round or ovoid shape that will rotate on the rollers 28. However, it should be understood that the oven 10 could be used to heat whatever product is desired.

Figure 2:
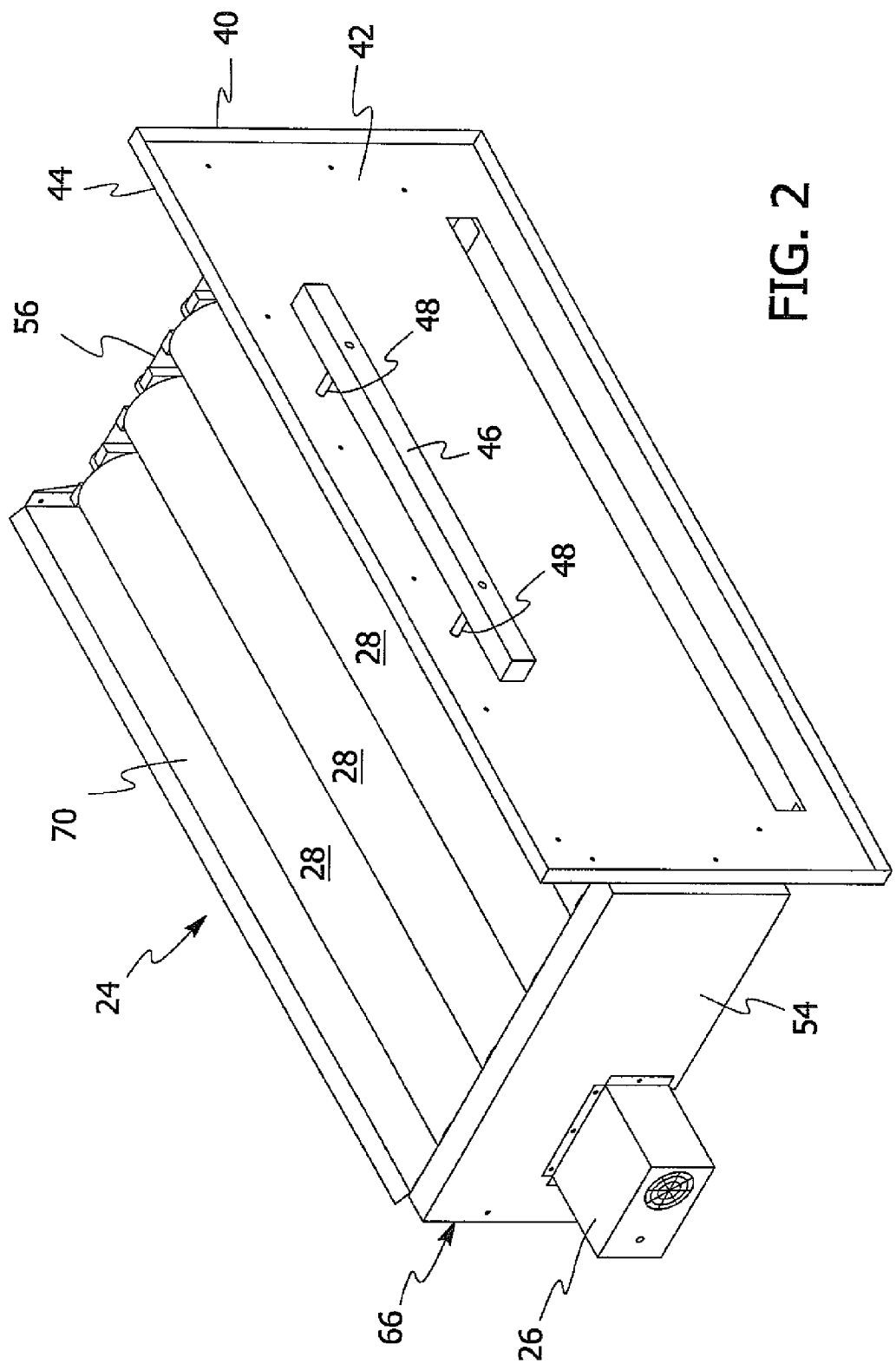
FIG. 2 is a perspective view of the drawer assembly.
Figure 3:
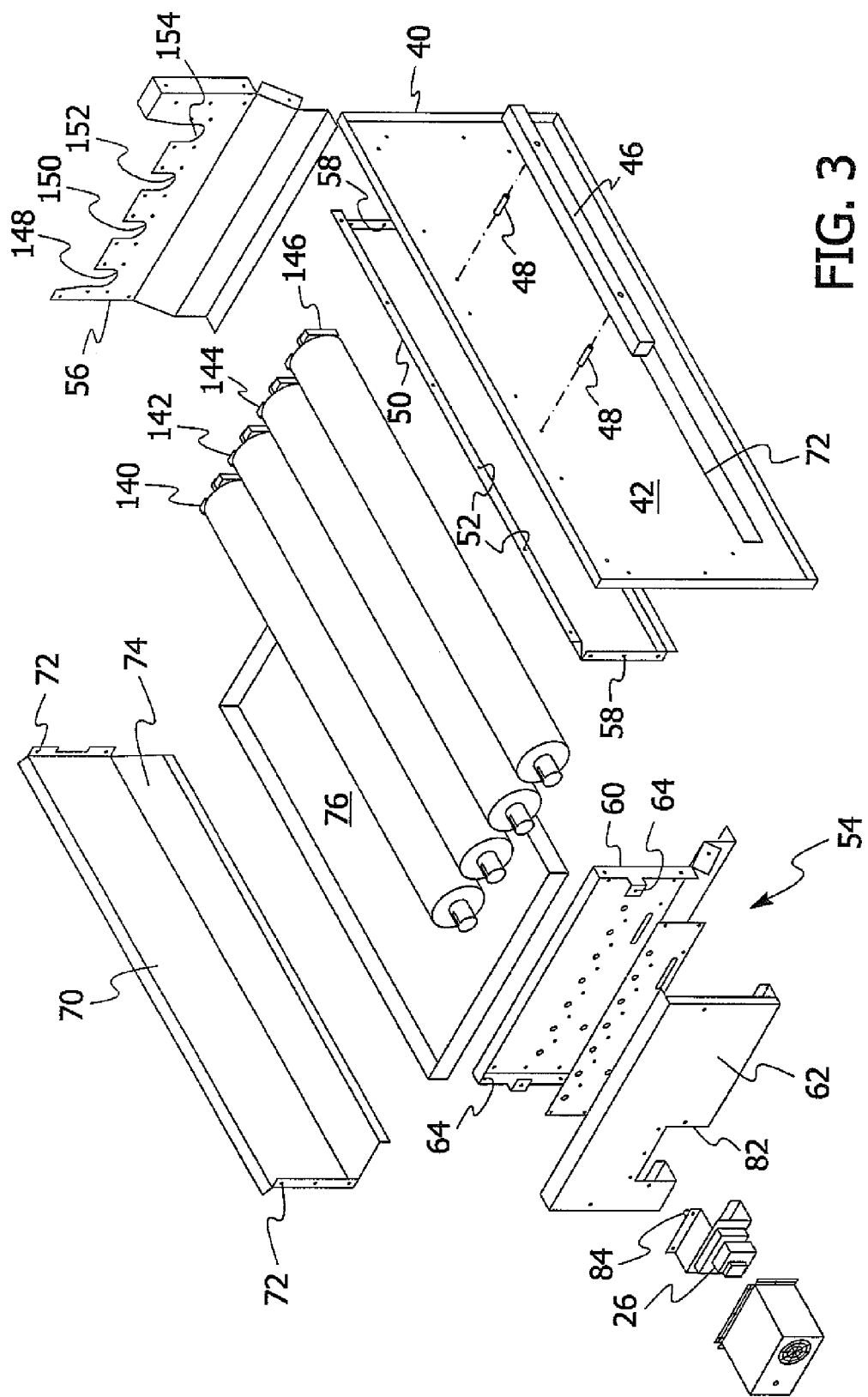
FIG. 3 is an exploded view of the drawer assembly of FIG. 2.

Now referring to FIG. 2 and FIG. 3, drawer assembly 24 is shown having a front wall 40 having a front surface 42 and a back surface 44. A handle 46 is attached to the front surface 42. The handle 46 is preferably attached to the front surface 42 by any suitable means such as screws or bolts (not shown). A pair of spacers 48 separate the handle 46 from the wall 40 which will become hot during operation of the oven 10. An attachment bracket 50 is secured to the back surface 44 of the front wall 40 by screws or bolts (not shown) at holes 52. Bracket 50 connects to the left sidewall 54 and the right sidewall 56 using screws or bolts (not shown) through holes 58. Left sidewall 54 is formed of two brackets 60 and 62 which when joined together by screws or bolts (not shown) through holes 64 form a gear housing 66 for containing a sprocket assembly 68 which will be described with reference to FIG. 6. Rear wall 70 extends between left sidewall 54 and right sidewall 56 and is attached at holes 72 by screws or bolts (not shown) to the respective sidewalls 54 and 56. Rear wall includes a shelf 74 extending from a lower portion thereof toward the front wall 40 to assist in supporting a drip pan 76 which can be inserted and removed through the slot 78 in front wall 40. The drip pan 76 is used to catch juices from the cooking food product and pan 76 is removable for cleaning.

Still referring to FIG. 3, the motor 26 is mounted at left sidewall 54 by screws or bolts (not shown) at an opening 82 for receiving the motor drive shaft 84. A typical motor for use in this system can be Gearmotor, 1.0 RPM, Torque 100, 115V, Open manufactured by Grainger.

Figure 4:
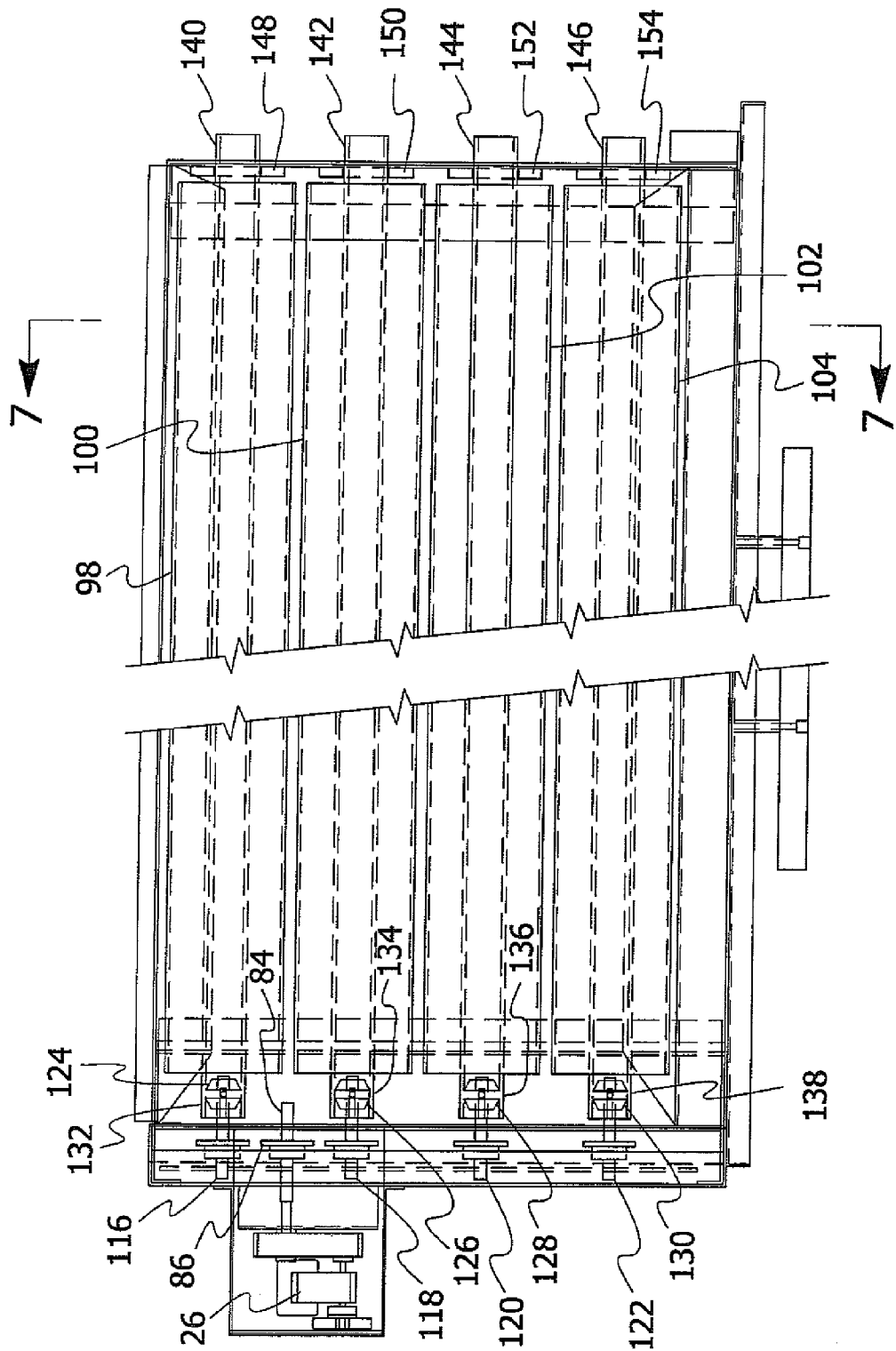
FIG. 4 is a top view of the drawer assembly of FIG. 2.
Figure 5:
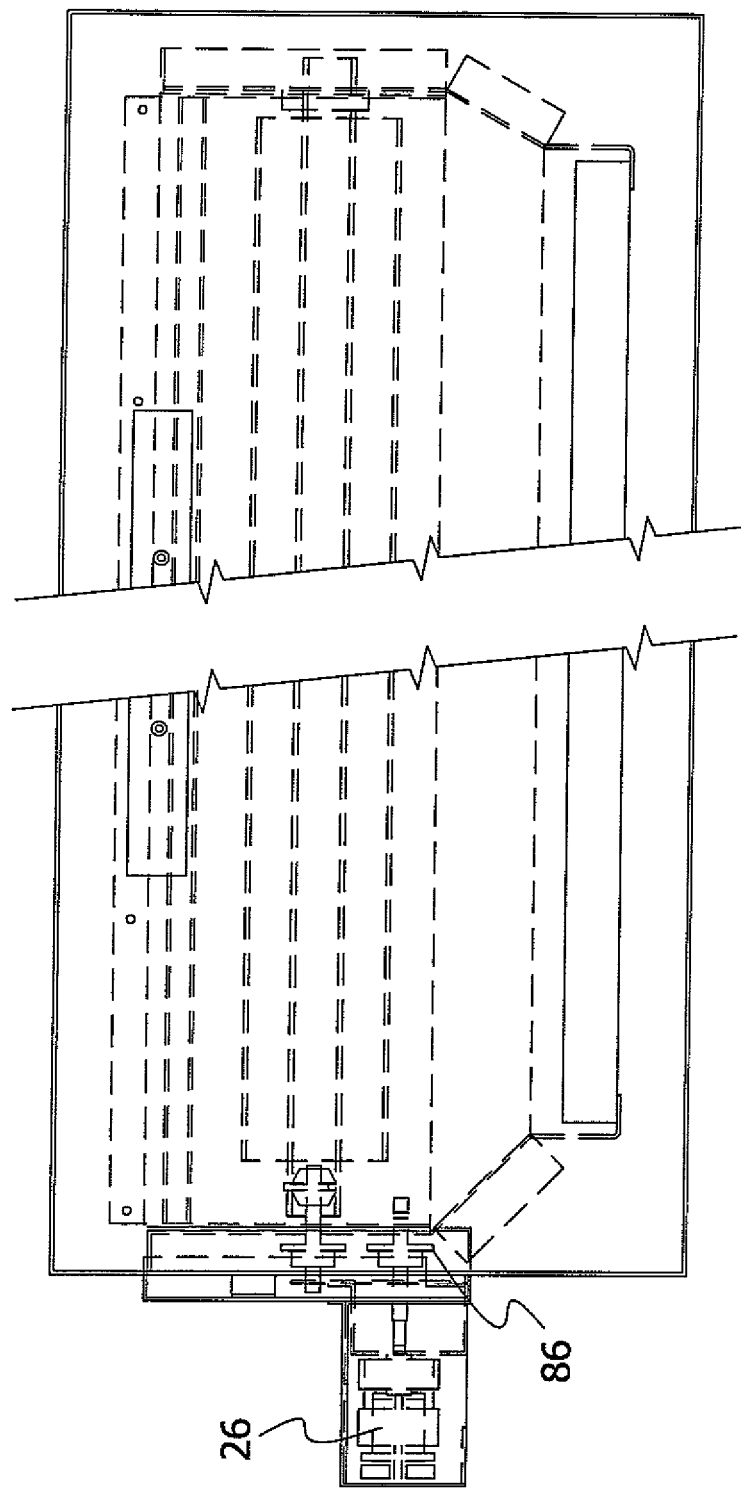
FIG. 5 is a front view of the drawer assembly of FIG. 2 showing the roller assembly in hidden lines.
Figure 6:
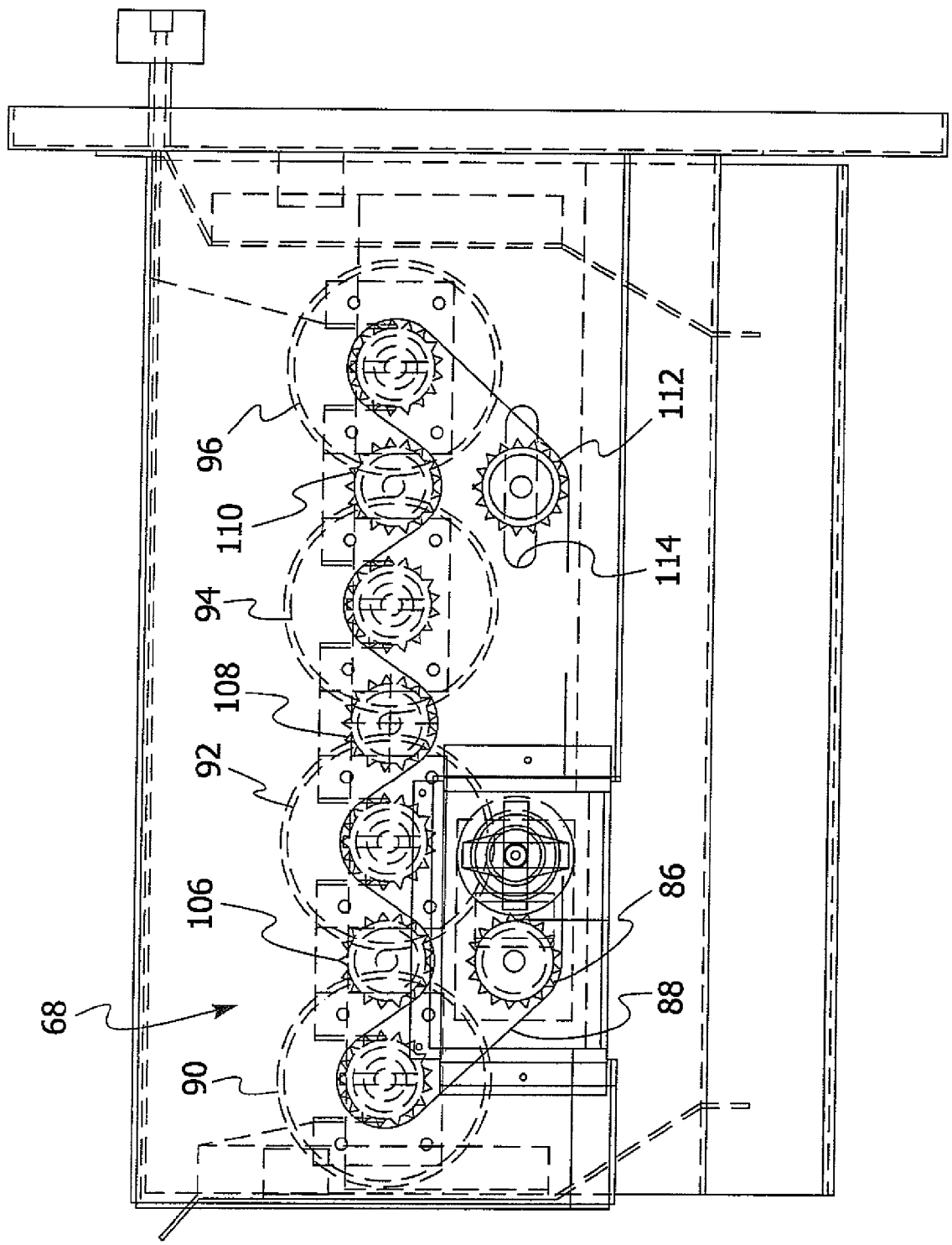
FIG. 6 is a left side view of the motor and gear assembly.

Now with reference to FIG. 4, FIG. 5 and FIG. 6 the drawer assembly 24 includes shaft 84 engages a drive sprocket 86 which drives a chain 88 which engages sprockets 90, 92, 94 and 96 which operate to turn the rollers 98, 100, 102 and 104, respectively. Sprockets 106, 108 and 110 are located between sprockets 90, 92, 94 and 96 to create a serpentine path in chain 88 to aid in keeping chain 88 engaged with sprockets 90, 92, 94 and 96. A tensioning sprocket 112 also engages chain 88 and is connected to sidewall 54 on adjustment slot 114. In the preferred embodiment the sprocket are 2.231 outside diameter sprocket such as those sold by Grainger Corporation having a model number 35B17F-1/2.

Each of the sprockets 90, 92, 94 and 96 is mounted on a spindle 116, 118, 120 and 122, respectively which extends through bracket 60 and into a bushing 124, 126, 128 and 130, respectively. The spindles 116, 118, 120 and 120 are spaced apart five and one-half inches. Each of bushings 124, 126, 128 and 130 engages a respective left end 132, 134, 136 and 138 of a roller 98, 100, 102 and 104 so that when a spindle 116, 118, 120 and 122 is rotated, its respective roller 98, 100, 102 and 104 is also rotated.

The right ends 140, 142, 144 and 146 of rollers 98, 100, 102 and 104, respectively rest in and are supported by bearing races 148, 150, 152 and 154 of right sidewall 56.

To aid in sliding the drawer assembly 24 in and out of oven 10, a pair of legs 200 are mounted at the bottom 160 of front wall 40 to support the drawer assembly 24 when it is in the extended position.

In operation, the oven is heated using the gas fired radiant burners located at the top thereof. The drawer assembly 24 is pulled outwardly. A food product is then placed on the rollers and the motor is turned on so that the food product rotates. The drawer assembly is then pushed back into the oven 10 and the food product is cooked under the radiant burners for a sufficient time. Usually about 5 to 10 minutes is sufficient to destroy any bacteria on the exterior of the food product. The roasting temperature is set at the high setting of preferably 750° to 800° F. during the entire cooking period. This tends to seal the juices into the meat as it cooks. The rollers 98, 100, 102 and 104 are also heated to a temperature of preferably 500° to 550° F. It should be understood that the product is not fully cooked. When cooking time is completed, the drawer assembly 24 is then pulled out again and the food product is removed.

Next the product is taken to a chilling station having a blast chiller which is of conventional design to chill the product down to near 40°. A blast chiller is basically a freezer having an interior temperature set at preferably about 5° F. and also having fans to blow the chilled air about inside the freezer to quickly chill the food product. When handling the food product after cooking it must be handled carefully with sterilized utensils since the surface of the product has been neutralized and is susceptible to other pathogens. It has also been found that the faster the product is cooled, the longer the shelf life will be.

Once the food product is cooled to preferably about 40°, the product is placed along with seasonings in a cook-in bag of conventional design and the bag is then vacuum-sealed and stored in a cooler at about 40° or less. Cook-in bags are used so that the food product can be ready to cook by the consumer. The seasonings are preferably irradiated to kill any pathogens before adding to the food product.

To clean the drawer assembly 24, the drawer assembly 24 is again pulled out and the rollers can be removed for cleaning.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. A method of treating a meat product to provide an extended shelf life, comprising the steps of:
   a) providing a infrared oven having a plurality of infrared heaters therein and a plurality of rollers spaced below the heaters and means for rotating the rollers;
   b) heating the infrared heaters to a temperature of about 1,600 F;
   c) placing a substantially round shape or ovoid shaped meat product on at least some of the rollers of the infrared oven for a period of time sufficient to kill any bacteria on the exterior of the meat product;
   d) rotating the meat product during heating by rotating the rollers;
   e) heating air within the oven to a temperature in the range of 750 F to 800 F using the infrared heaters located above the rollers; and
   f) heating the rollers to a temperature in the range of 500 F to 550 F using the infrared heaters located above the rollers.

2. The method of treating a meat product as set forth in claim 1 wherein:
   a) the step of placing the meat product in a heated oven includes cooking the meat product for a time of less than 10 minutes.

3. The method of treating a meat product as set forth in claim 1 including the step of;
   a) placing the meat product in a chilling station and subjecting the meat product to a chilled air having a temperature of about 5 F until the meat product reaches a temperature of about 40 F.

4. The method of treating a meat product as set forth in claim 1 including the step of;
   a) placing the meat product in a cook-in-bag and vacuum sealing said bag.

5. The method of treating a meat product as set forth in claim 4 further including the step of:
   a) adding seasonings into the bag before vacuum sealing said bag.

6. The method of treating a meat product as set forth in claim 5 including the step of:
   a) irradiating said seasonings prior to adding the seasonings into said bag.

* * * * *